United States Patent [19]

Curry

[11] Patent Number: 5,397,523
[45] Date of Patent: Mar. 14, 1995

[54] METHOD AND APPARATUS FOR SIZING COMPOSITE TOWS

[75] Inventor: Wilbur R. Curry, Milford, Ohio

[73] Assignee: Cincinnati Mliacron Inc., Del.

[21] Appl. No.: 93,911

[22] Filed: Jul. 20, 1993

[51] Int. Cl.⁶ .................. B29C 70/20; B29C 70/00
[52] U.S. Cl. ..................... 264/136; 264/137; 264/174; 264/280; 156/166; 156/180
[58] Field of Search ............ 156/166, 180, 181, 441, 156/433, 425, 360; 264/280, 136, 137, 174; 425/363

[56] References Cited

U.S. PATENT DOCUMENTS

| | | | |
|---|---|---|---|
| 3,112,234 | 11/1963 | Krupp | 156/173 X |
| 3,356,783 | 12/1967 | Phillips | 425/363 X |
| 3,363,849 | 1/1968 | McLarty . | |
| 3,372,222 | 3/1968 | Romesberg et al. | 264/290.7 X |
| 3,616,078 | 10/1971 | Howard . | |
| 3,617,414 | 11/1972 | Wesch | 156/180 X |
| 3,737,352 | 6/1973 | Avis et al. . | |
| 3,775,219 | 11/1973 | Karlson et al. . | |
| 4,273,601 | 6/1981 | Weingart . | |
| 4,292,108 | 9/1981 | Weiss et al. . | |
| 4,419,170 | 12/1983 | Blad . | |
| 4,541,884 | 9/1985 | Cogswell | 156/166 |
| 4,557,790 | 12/1985 | Wisbey . | |
| 4,559,262 | 12/1985 | Cogswell et al. | 156/166 X |
| 4,626,306 | 12/1986 | Chabrier et al. | 156/180 |
| 4,699,683 | 10/1987 | McCowin . | |
| 4,790,898 | 12/1988 | Woods | 156/166 |
| 4,804,509 | 2/1989 | Angell, Jr. et al. | 264/280 X |
| 4,822,444 | 4/1989 | Weingart et al. . | |
| 4,877,471 | 10/1989 | McCowin et al. . | |
| 4,900,499 | 2/1990 | Mills | 156/180 X |
| 4,919,739 | 4/1990 | Dyksterhouse et al. | 156/180 X |
| 4,997,503 | 3/1991 | Bohannan et al. | 156/173 X |
| 5,110,395 | 5/1992 | Vaniglia . | |
| 5,200,018 | 4/1993 | Gill et al. | 156/425 X |
| 5,296,064 | 3/1994 | Muzzy et al. | 156/166 X |

FOREIGN PATENT DOCUMENTS 407744 12/1973 U.S.S.R. ................. 156/380

Primary Examiner—Jeff H. Aftergut
Attorney, Agent, or Firm—Thomas M. Farrell; Steven J. Rosen

[57] ABSTRACT

A method and apparatus for forming composite tows of uniform width comprises a tow tensioner mechanism which carries a reel having a length of tow of non-uniform width, a tow sizing unit, a drive roller unit and a tow winding device. A single tow is fed from the tensioner mechanism to the tow sizing unit where the side-to-side or width dimension of the tow is sized, and then the sized tow is transmitted through the drive roller unit to the tow winding device which winds the sized tow onto a reel. The tow sizing unit includes a rotatable sizing wheel having a circumferential flanged groove, and a presser roller, which cooperate to confine the tow on all four sides, i.e., top, bottom and opposed side edges, as the tow is pressed therebetween to form a finished, sized tow having a substantially uniform width.

23 Claims, 9 Drawing Sheets

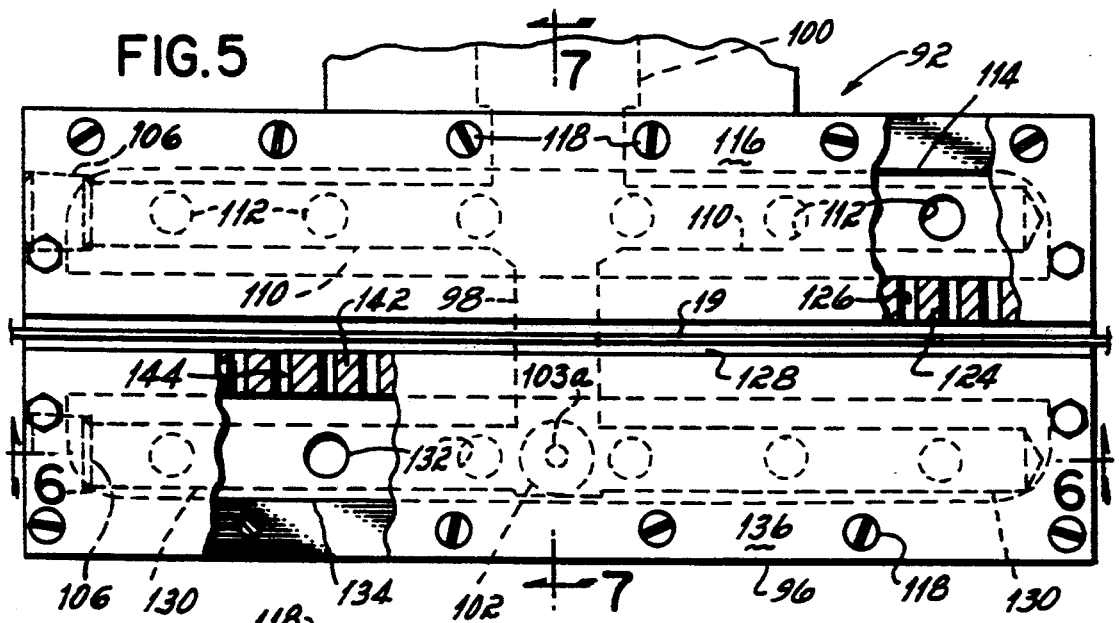
FIG. 5
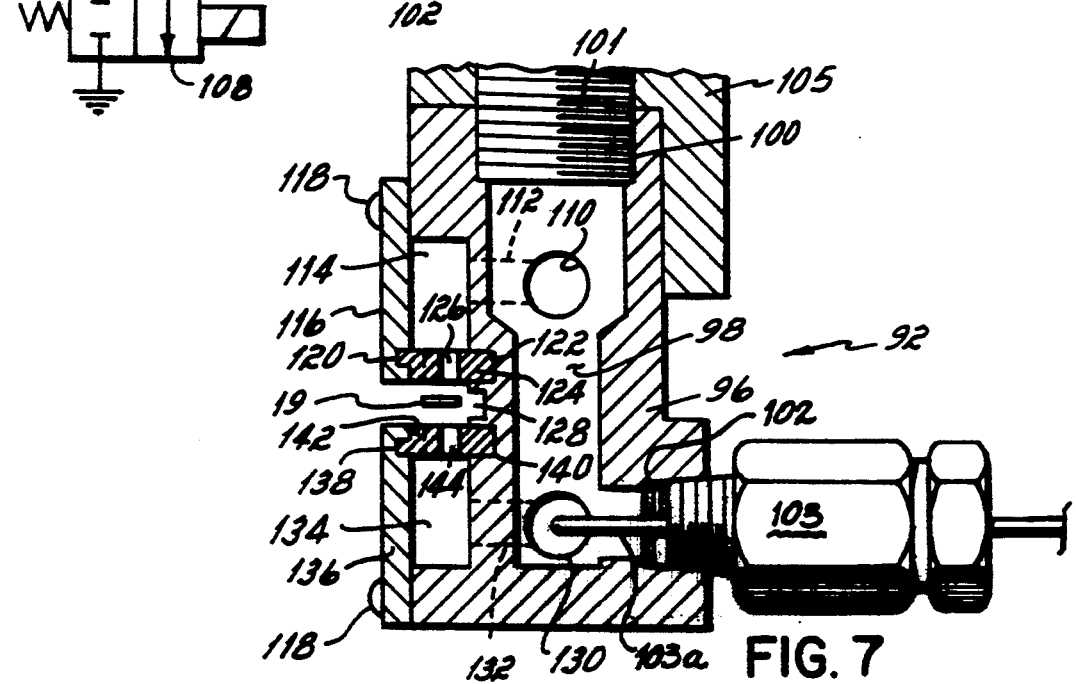
FIG. 6
FIG. 7

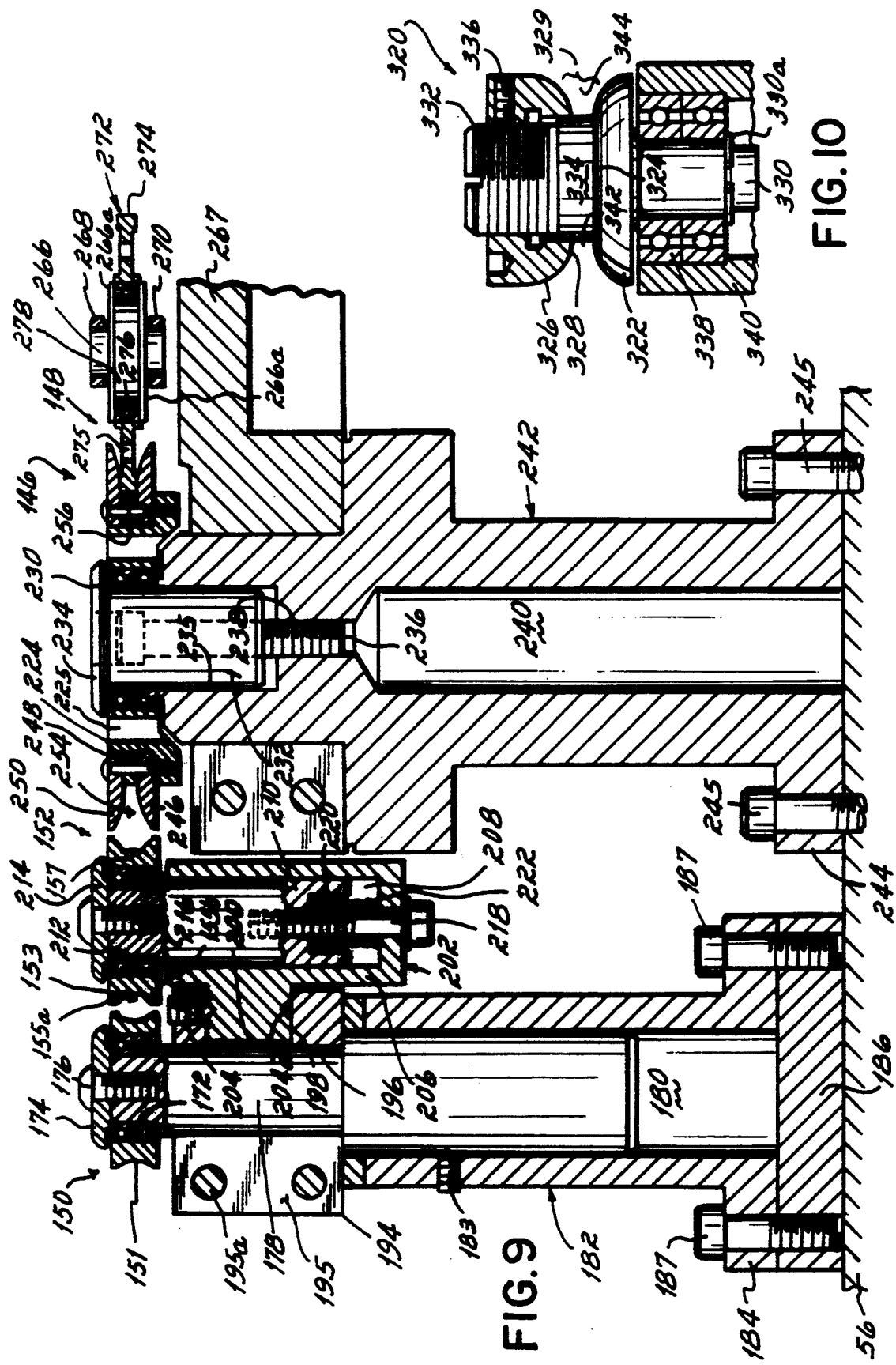

METHOD AND APPARATUS FOR SIZING COMPOSITE TOWS

FIELD OF THE INVENTION

This invention relates to a method and apparatus for sizing composite tows, and, more particularly, to a method and apparatus for processing a tow of composite material consisting of a number of fibers impregnated with a binder or matrix material to produce an essentially continuous ribbon-like band or strand having a substantially uniform side-to-side or width dimension.

BACKGROUND OF THE INVENTION

The use of reinforced plastics or composites in the fabrication of structural components has grown substantially in recent years. Composite structures are formed by overlapping layers of "tows", i.e., an essentially continuous band or strand of composite material consisting of a number of graphite, aramid, glass or other high strength fibers impregnated with a binder or matrix material either at the time of forming the composite structure or beforehand in which case the tow is also referred to as a "towpreg". Common matrix materials include tacky B-stage resins later cured to a thermoset stage, e.g., epoxies; non-tacky solid resins which melt and flow prior to curing to a thermoset polymer, e.g., bismaleimides; and, non-tacky thermoplastic resins processed entirely by melting and freezing, e.g., PEEK (polyetheretherketone) and PPS (polyphenylene sulfide). Composite structures have become increasingly popular as a replacement for metallic parts, particularly in high performance applications such as in the aircraft industry, because of the high strength-to-weight ratio, good corrosion resistance, good impact resistance and high electrical and thermal resistance exhibited by composite parts.

One aspect of the composites industry which has restricted the use of composite parts in some applications is that traditionally many composite parts had to be fabricated by hand or with several manual operations. The technology of automating the formation of composite parts continues to evolve, but there are three currently available techniques which are effective to varying degrees in forming composite parts of different shapes from composite tows.

One automated technique of forming composite parts involves the use of filament winding machines which employ a wet winding procedure in which fibers of the filamentary material are drawn through a resin bath mounted on a traversing carriage having a pay out eye. A form or tool, carried on a rotating mounted structure, is located with respect to the carriage such that the resin impregnated fibers are guided under tension by the pay out eye longitudinally along the rotating tool. The pay out eye is effective to lay down the individual fibers side-by-side to form a band or tow in the form described above, and the pay out eye traverses the tool from end to end laying down successive layers of fiber tows until the desired wall thickness is built up on the tool. The resin or matrix material is cured on the tool, and then the tool is removed leaving the cured wound composite structure. See, for example, U.S. Pat. No. 3,363,849.

A second generation composite part forming device, commonly referred to as a tape laying machine, is disclosed, for example, in U.S. Pat. Nos. 3,616,078; 4,822,444; 4273,601; 3,775,219; 4,292,108; and 4,419,170. Machines of this type lay down a relatively wide "tape", typically 0.007–0.014 inches (1.8–3.6 millimeters) in thickness and 3–12 inches (76–305 millimeters) wide, which comprise a preimpregnated group of continuous tows or towpregs oriented parallel to one another on a carrier material such as paper and reeled for storage. The individual bands or tows are melded edge-to-edge on the carrier to form a substantially continuous composite tape of desired width. These tapes are carried in a placement head supported by structure capable of manipulating the placement head relative to a tool or form about a number of axes. Unlike filament winding devices, tape laying machines are capable of accommodating more complex shaped parts because the tows which form the tape are pressed or compacted directly onto the tool by a compaction roller or shoe carried on the placement head. The mechanisms which carry the placement head are effective to maintain the roller or shoe substantially perpendicular to the surface of the tool such that the tape is pressed against non-planar surfaces of the tool. As a result, tape laying machines are more versatile than filament winding apparatus for large gently contoured parts and have been effective in automating the production of some parts which had previously been constructed entirely by hand or with a number of hand lay up operations.

A third generation of automated devices for the fabrication of composite parts is disclosed, for example, in U.S. Pat. No. 4,699,683 to McCowin and U.S. Pat. No. 5,110,395 to Vaniglia, which is owned by the assignee of this invention. Apparatus of the type disclosed in these patents are referred to as "fiber placement" machines and differ from tape laying machines in that they apply a number of individual tows side-by-side onto a form or tool rather than a preformed tape that is reeled with a carrier material. Fiber placement machines include a creel assembly consisting of a number of reels or spools of tows or towpregs which are individually fed at independently controlled rates to a fiber placement head. The fiber placement head includes structure for handling each tow individually including guides or channels for transmitting each individual tow through the fiber placement head, cutters for individually cutting each tow, clamping mechanisms to clamp each cut tow and restart mechanisms to advance the cut tows to a compaction roller or shoe which presses such tows onto the surface of a tool. The fiber placement head feeds a predetermined number of tows, side-by-side, to the compaction shoe to form a relatively wide band consisting of a number of individual tows.

The effectiveness of each of the above-described methods and apparatus for forming composite structures depends, in different degrees, upon the dimensional accuracy with which the tows are formed. As mentioned above, in order to form a composite part using any of the above-described techniques, the tows or towpregs must be laid down side-by-side onto a tool or form, or onto a carrier material such as paper to form a tape which is then applied to the tool or form. If the width dimension of the tow or towpreg is inconsistent, i.e., has a side-to-side dimensional variation, the tows or towpregs can be laid down on the tool such that a gap is formed between adjacent tows, or such that adjacent tows overlap one another. Gaps between adjacent tows can produce weaknesses in the resulting composite parts, and undue overlapping of adjacent tows with one another can result in the waste of material and/or the production of composite parts having a greater wall thickness than desired.

The formation of composite tows having a uniform width dimension is particularly important in connection with the operation of fiber placement machines described in U.S. Pat. No. 4,699,683 and U.S. Pat. No. 5,110,395. As mentioned above, these types of devices employ a fiber placement head which includes a separate guide or channel for each individual tow through which such tows are advanced before they are pressed onto the surface of the tool by a compaction roller or shoe. If the tows are too wide, they can bunch up within the channels or guides and fail to pass through the fiber placement head. On the other hand, tows which are too narrow can be laid down by the fiber placement head such that gaps are formed therebetween on the form or tool.

The formation of individual tows, and composite "tapes" consisting of a number of tows side-by-side on a carrier material, has been addressed in the prior art. The formation of composite tapes is disclosed, for example, in U.S. Pat. Nos. 3,737,352 to Avis et al and 4,557,790 to Wisbey. In the Avis et al patent, a method and apparatus for forming a tape is disclosed which comprises directing a number of individual tows through a resin bath, drying them and then orienting the tows side-by-side within a groove of a shaft where they are melded together edge-to-edge by a roller inserted within the groove. Each of the individual tows are guided through the resin bath and into the shaft groove by different mechanisms such as a "comb", i.e., upright, side-by-side pegs, or, alternatively, a pair of stepped shafts each having alternating slots and raised lands wherein the slots of one shaft are axially offset from the slots of the second shaft so that the tows are supplied side-by-side to the tape forming groove. But no provision is made in the Avis et al apparatus to control the width dimension of each individual tow. As a result, the several tows are pressed together, side-by-side, between the forming rollers to form a composite tape in which spaces may be present between adjacent tows and/or wherein the adjacent tows may overlap one another.

In the Wisbey U.S. Pat. No. 4,557,790, an apparatus for making tape in situ on a tape laying machine is disclosed wherein a plurality of parallel, resin impregnated towpregs are deposited onto a paper carrier strip which is then run through compaction and back up rolls to flatten and widen the tows until contiguous tow edges are melded into a composite tape strip. As in the Avis et al disclosure, no provision is made in the Wisbey device for accurately controlling the width of each individual tow.

U.S. Pat. No. 4,877,471 to McCowin et al discloses a method and apparatus for delivering a resin impregnated multi-filament band. A plurality of rovings, each comprised of a bundle of resin impregnated filaments, are supplied from a creel assembly having multiple spools of rovings. Each roving is compacted to a predetermined thickness between a compaction roller and a back up roller, and then these compacted rovings are trained around guide rollers adjusted to present the rovings in side-by-side alignment to form a tow which is thereafter wound on a winding mandrel. An important limitation of the apparatus disclosed in the McCowin U.S. Pat. No. 4,877,471, and other systems of this general type, is that precise control of the roving width cannot be accomplished since the width is only indirectly controlled by flattening each tow to a uniform thickness. This is because no structure is provided to confine the side edges of the fiber bundle or rovings as they are compacted in the side-to-side or width direction. As a result, any variation in the cross-sectional shape and/or size of the rovings will produce a flattened tow having a uniform thickness but a non-uniform width. As mentioned above, this presents a particular problem in fiber placement machines where a relatively close tolerance must be maintained on the width dimension of the tow supplied thereto to avoid bunching up within the fiber placement head, or the formation of gaps between adjacent tows when they are compacted onto the form or tool.

SUMMARY OF THE INVENTION

It is therefore among the objectives of this invention to provide a method and apparatus for sizing composite tows in which the tows are formed with a substantially uniform width and a substantially uniform thickness.

These objectives are accomplished in a method and apparatus which comprises a tow tensioner mechanism which carries a reel having a length of tow of non-uniform width, a tow sizing unit, a drive roller unit and a tow winding device. A single tow is fed from the tensioner mechanism to the tow sizing unit where the side-to-side or width dimension of the tow is sized and then the sized tow is transmitted through the drive roller unit to the tow winding device which winds the sized tow onto a spool. The tow sizing unit includes a rotatable sizing wheel having a circumferential flanged groove, and a presser roller insertable within the groove against the tow, which cooperate to confine the tow on all four sides, i.e., top, bottom and opposed side edges, as the tow is pressed therebetween to form a finished sized tow having a substantially uniform width.

In the presently preferred embodiment, particularly for some types of tow materials, the sizing unit includes a tow heating device located upstream from the sizing wheel through which the tow is directed to raise its temperature prior to the sizing operation. Flattening rollers, located either upstream or downstream from the heating device, function to engage the tow and at least partially flatten it prior to movement to the sizing wheel. In this manner, the incoming tow is flattened to at least a predetermined minimum width so that a tow of substantially uniform width can be produced by the sizing wheel. These flattening rollers also function to help guide the tow into the flanged groove of the sizing wheel in preparation for the sizing operation.

The sizing wheel is preferably formed with a circumferential flanged groove which defines a cylindrical-shaped bottom surface and opposed, curvilinear side surfaces which extend radially outwardly from the bottom surface. The sizing wheel is freely rotatable, and its flanged groove has an inlet or throat portion wherein the opposed side surfaces of the groove are flared outwardly from one another so that the tow can smoothly enter the flanged groove without obstruction. This construction of the flanged groove is particularly important where the flattening or guide rollers are eliminated and the tow is supplied directly from the tensioner device because, in such instance, the tow tends to move side-to-side as it is unwound from the supply reel at the tensioner device. The arcuate or curvilinear side surfaces of the flanged groove formed in the sizing wheel extend substantially parallel to one another at least immediately adjacent the bottom surface of the groove so that an accurate, predetermined axial distance is provided between the side surfaces along the bottom surface of the groove which corresponds to the desired width of the sized composite tow. In an alternative embodiment, the sizing wheel is formed with opposed side surfaces wherein at least one of the side surfaces is axially adjustable to vary the axial space therebetween and thus accommodate tows of different, finished widths. In either embodiment of the sizing wheel, the presser roller is biased toward the bottom surface of the groove by a tension spring or fluid cylinder to force the composite tow between the side surfaces and against the bottom surface of the groove. Because the tow is confined along its top and bottom surfaces, and along its opposed side edges, the finished or sized width of the tow is made substantially uniform within acceptable tolerances.

In the presently preferred embodiment, the sizing unit of this invention includes an incoming laser gauging device located upstream from the sizing wheel which is effective to measure the width of the nonuniform tow supplied from the tensioner unit. A second, outgoing laser gauging unit is located downstream from the sizing wheel to provide measurements of the width of the tow after sizing for comparison with the input width and to provide confirmation that the sized tow is within a predetermined range or tolerance of desired width. Cooling devices are also provided downstream from the sizing wheel which at least partially cool the tow, and also cool the sizing wheel, presser roller and the guide or flattening rollers. The cooled, sized tow is then transmitted to the take up winder which wraps the tow around a spool. Because the width dimension of the tow is accurately and reliably controlled by the method and apparatus of this invention, the problems with non-uniform width tows are eliminated which is of particular advantage in connection with the operation of fiber placement machines of the type described above.

DESCRIPTION OF THE DRAWINGS

The structure, operation and advantages of the presently preferred embodiment of this invention will become further apparent upon consideration of the following description, taken in conjunction with the accompanying drawings, wherein:

FIG. 3 is a plan view of the input laser gauging mechanism taken generally along line 3—3 of FIG. 2;

FIG. 5 is an enlarged view of the tow heating nozzle;

FIG. 6 is a cross-sectional view of the heating nozzle of FIG. 5 taken generally along line 6—6 of FIG. 5;

FIG. 7 is a cross-sectional view taken generally along line 7—7 of FIG. 5;

FIG. 9 is a cross-sectional view taken generally along line 9—9 of FIG. 8; and

FIG. 10 is a cross-sectional view of an alternative embodiment of the rotary sizing wheel of this invention.

DETAILED DESCRIPTION OF THE INVENTION

It should be noted that certain attitudinal references contained herein, for example, "righthand", "lefthand", "downwardly", etc., are made for the convenience the reader in following the specification and drawings, and are not to be construed as limitations of the invention.

Figure 1:
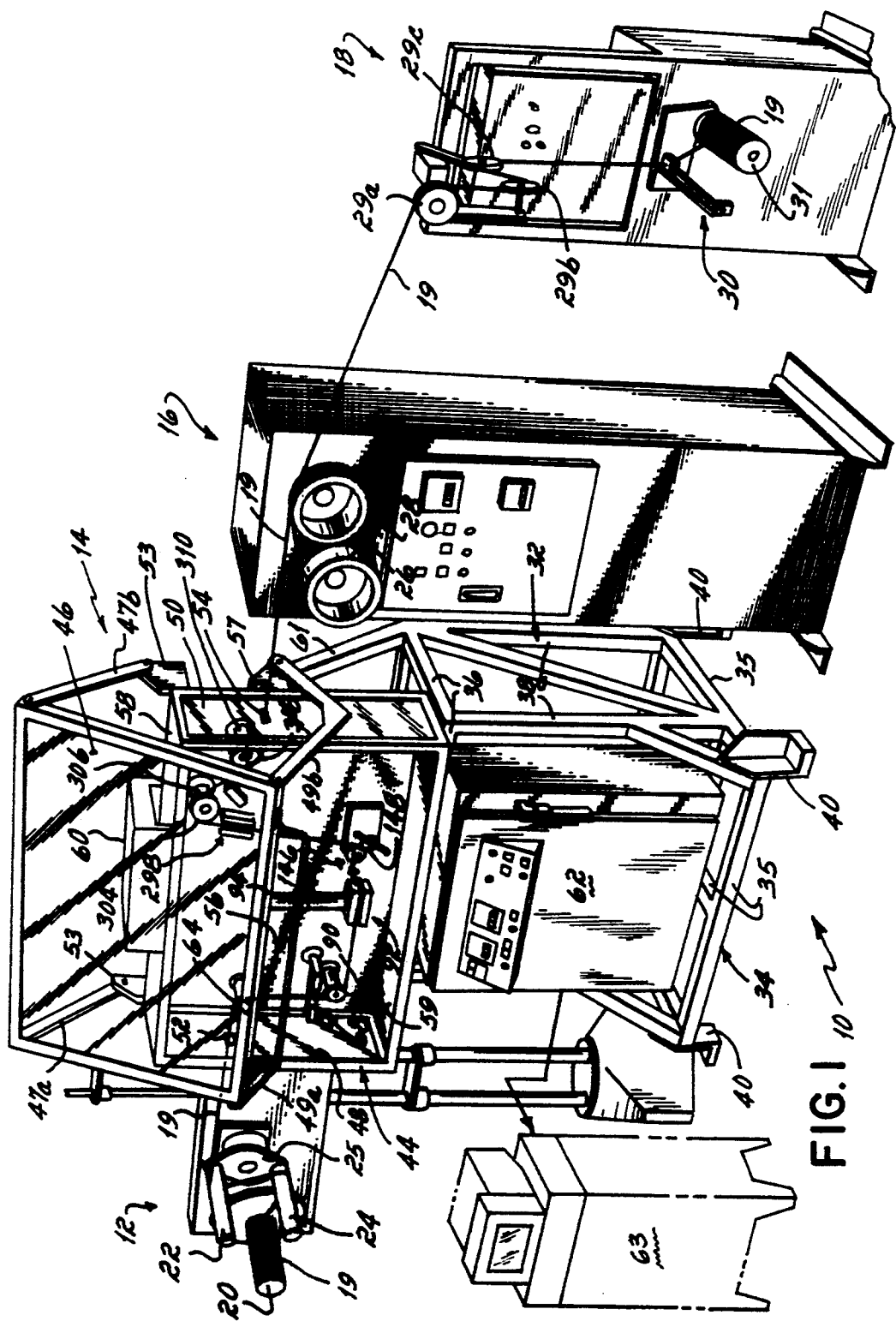
FIG. 1 is a schematic view of the overall construction of the tow sizing apparatus of this invention.

Referring now to FIG. 1, the tow sizing apparatus 10 of this invention includes a tensioner unit 12, a tow sizing unit 14, a drive unit 16 and a take up winder 18. This invention is predicated upon the detailed construction and operation of the tow sizing unit 14 whereas the units 12, 16, and 18 are commercially available and their detailed construction forms no part of this invention. For purposes of the present discussion, the tension unit 12 is preferably of a type commercially available from the CTC Co. The tensioner unit 12 generally comprises a reel 20 for supporting a roll of "tow" 19. As used herein, the term "tow" is meant to refer to an essentially continuous composite strand or band of fibers such as graphite, aramid, high strength glass or other types, impregnated with a binder or matrix material such as epoxy or the other types of resins described in the background section herein. A tow which is pre-impregnated with matrix material is commonly referred to as a "towpreg", but, for purposes of discussion, the terms "tow", "composite tow" and "towpreg" are used interchangeably to describe the method and apparatus of this invention.

The tow 19 carried on the reel 20 of tensioner unit 12 is trained around tensioner rolls 22 and 24 which are mounted on a spring biased swiveling arm 25 operative to maintain tension on the tow 19 and remove slack. As mentioned above, the detailed construction and operation of the tensioner unit 12 forms no part of this invention, and is not discussed herein.

The tow 19 is directed from the tensioner unit 12 to the tow sizing unit 14 where it is formed with a substantially uniform width in a manner described in detail below. From the tow sizing unit 14, the tow 19 is directed to the drive unit 16 which is preferably a Kamitsu drive commercially available from Izumi International, Inc., of Greenville, S. C. As schematically depicted in FIG. 1, the tow 19 is wrapped around each of two drive rollers 26 and 28 of the drive unit 16 which function to pull the tow 19 from the tensioner unit 12 and through the tow sizing unit 14.

After leaving the drive unit 16, the tow 19 is directed to the take up winder 18 which is also commercially available from Izumi International, Inc. The take up winder 18 includes a series of rollers 29a, b, c which direct the tow 19 to a winding unit 30. The winding unit 30 is effective to move the tow 19 back and forth axially to helically wind the tow 19 on take up reel 31.

TOW SIZING UNIT

Figure 2:
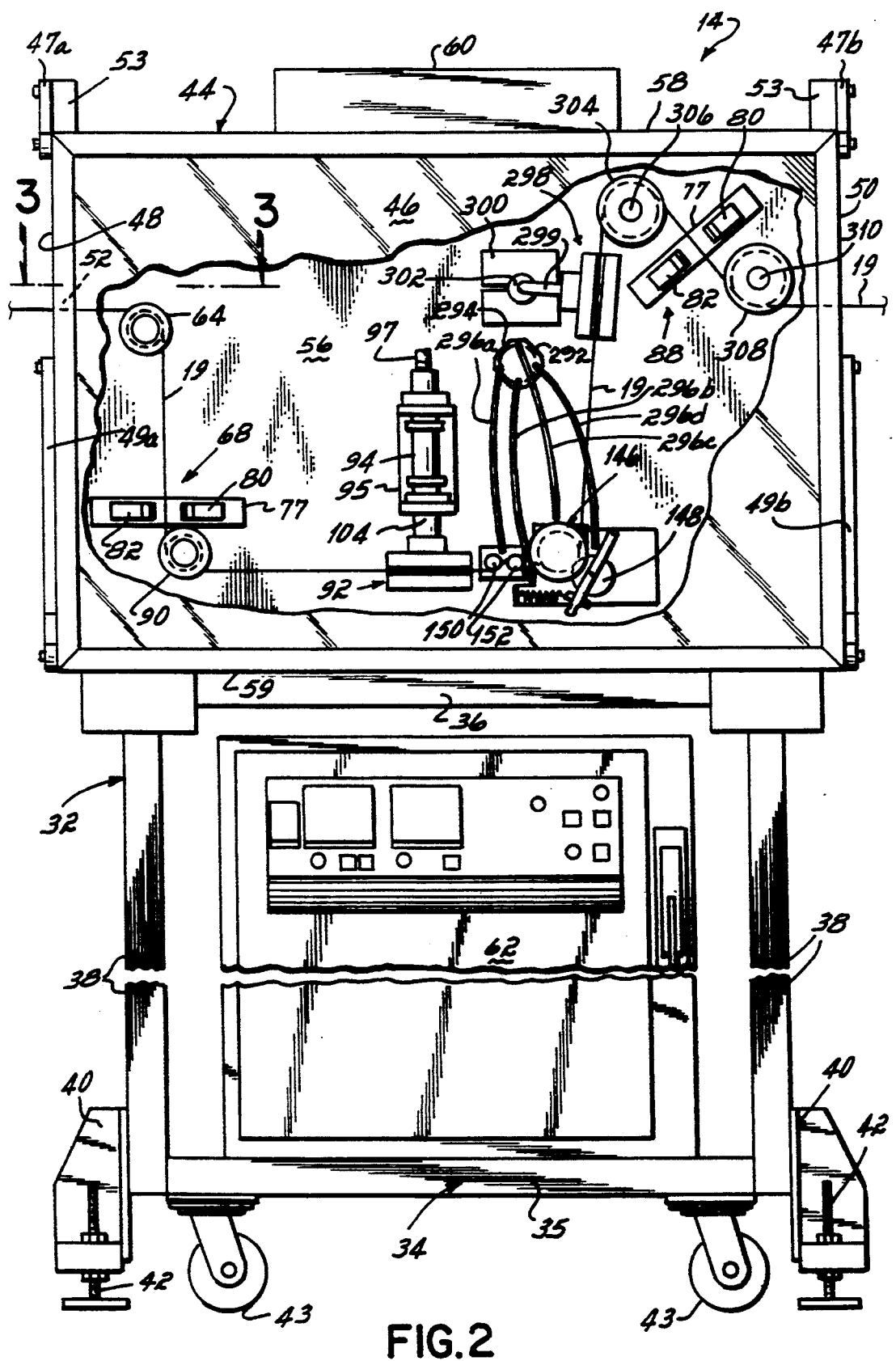
FIG. 2 is an enlarged front view of the tow sizing unit shown in FIG. 1.

With reference to FIGS. 1 and 2, the tow sizing unit 14 generally comprises a support frame 32 including a base 34 comprising lower horizontally oriented support members 35, upper horizontal members 36 located vertically above members 35, and substantially vertical supports 38 which interconnect the horizontal supports 35, 36. A flange 40 is mounted at each corner of the base 34, and these flanges each carry a leveling leg 42 of conventional design which are adjustable to properly level the tow sizing unit 14. Casters 43 are also preferably mounted to the base 34 so that the tow sizing unit 14 can be easily moved. For purposes of the present discussion, the terms "horizontal", "vertical", "clockwise", "counter-clockwise" and other direction or attitudinal terms are made with reference to the tow sizing unit 14 as depicted in the FIGS. It should be understood, however, that the structure and operation of this invention is applicable to a wide variety of other orientations of the unit.

The upper horizontal supports 36 of base 34 mount a cabinet 44 which houses the various elements of the tow sizing unit 14 described in detail below. Preferably, the cabinet 44 is formed with a front panel 46, a side panel 48 which faces the tensioner unit 12 and an opposite side panel 50 which faces the drive unit 16. Each of the side panels 48, 50 is formed with an opening 52, 54, respectively, to receive the tow 19. The front panel 46 is movable between a closed position, and an open position by operation of a pair of upper hinge arms 47a, b and a pair of lower hinge arms 49a, b. The position of front panel 46 depicted in FIG. 1 is an intermediate position to illustrate its movement. The upper hinge arms 47a, b are each carried by a bracket 53 connected to a mounting plate 56 which forms the back side of cabinet 44. The lower hinge arms 49a, b each pivotally mount to a bracket 57 carried by a rear brace 61. The bracket 57 and rear brace 61 help support the mounting plate 56 and cabinet 44 atop the base 34. Preferably, the top 58 of cabinet 44 includes a housing 60 carrying a removable filter (not shown) which provides a vent for the cabinet 44 and filters any particulate material which may be dislodged or separated from the composite tow 19 as it moves through the cabinet 44. The bottom 59 of cabinet 44 rests atop the upper horizontal supports 36 of base 34.

A control unit 62 is carried by the base 34 beneath the cabinet 44. This control unit 62 governs the operation of the various elements of the tow sizing unit 14, described in detail below, in timed relation with the operation of the tensioner unit 12, drive unit 16 and take up winder 18. The detailed construction of the control unit 62 forms no part of this invention and is therefore not discussed herein.

Having described the overall construction of the tow sizing unit 14, the following description includes a discussion of each element within the cabinet 44.

TOW WIDTH MEASUREMENT

Figure 4:
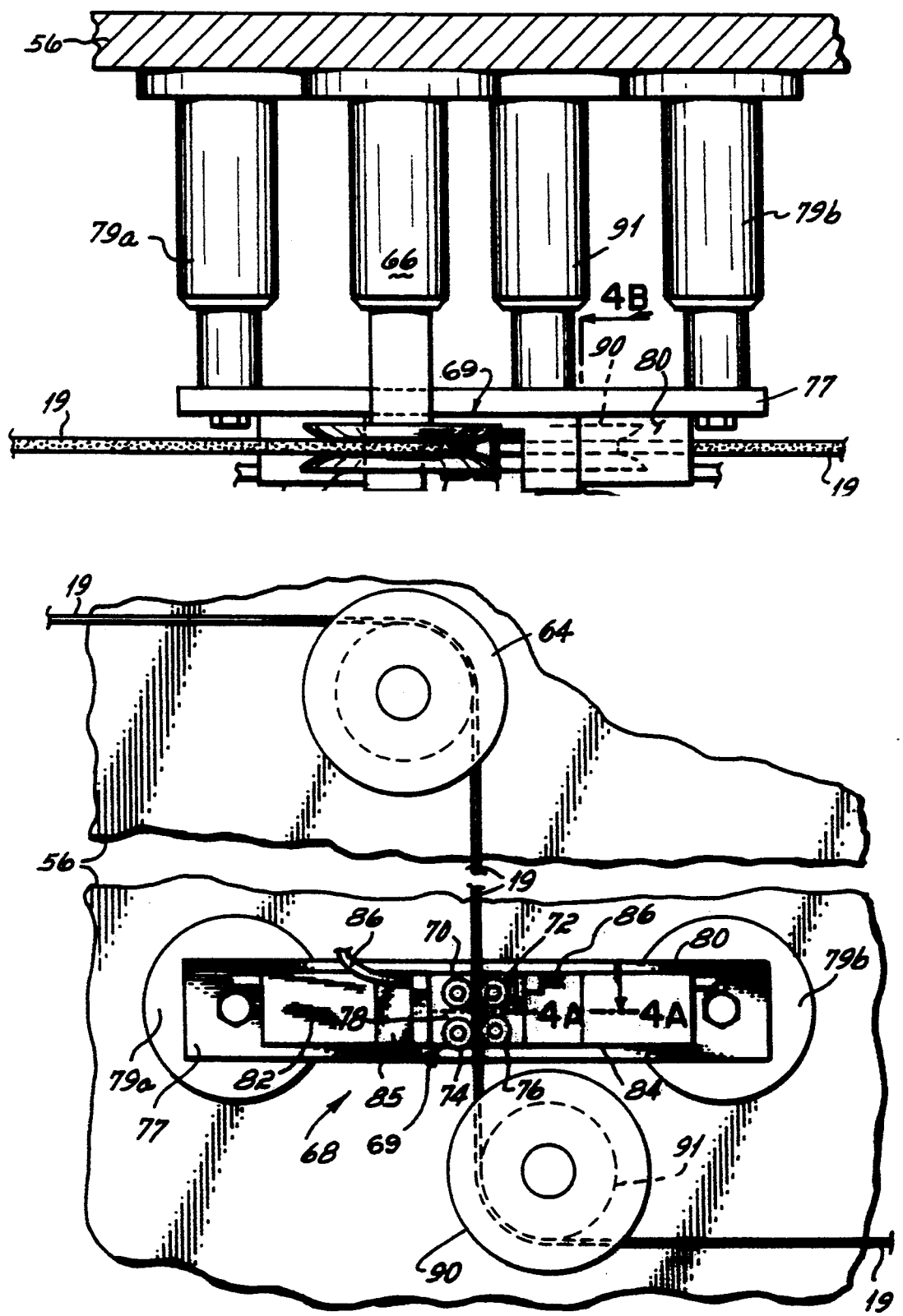
FIG. 4 is an enlarged front view of the laser gauging mechanism shown in FIG. 3.

With reference to FIGS. 2–4, the tow 19 enters cabinet 44 through the opening 52 in side panel 48 and is trained around an idler roller 64 mounted by a stand-off 66 to the mounting plate 56. The tow 19 moves in a clockwise direction around the idler roller 64 and then vertically downwardly into an incoming tow gauging assembly 68. The incoming gauging assembly 68 comprises a first pair of anti-twist rollers 70, 72 and a second pair of anti-twist rollers 74, 76 mounted below the first rollers 70, 72. The rollers 70, 72 and 74, 76 are freely rotatable on a U-shaped bracket 69, which is carried by a support plate 77. The support plate 77 is mounted to its opposite ends to stand-offs 79a and 79b extending from the mounting plate 56. The purpose of the roller pairs 70, 72 and 74, 76 is to receive the tow 19 therebetween and substantially prevent it from twisting in the course of passage through the gauging assembly 68.

A vertical space 78 is formed between the roller pair 70, 72 and roller pair 74, 76 so that a laser beam may be directed between a laser sending unit 80 mounted on plate 77 at one side of the tow 19, and a laser receiving unit 82 mounted to plate 77 on the opposite side of the tow 19. The laser sending and receiving units 80, 82 are commercially available from The Keyence Company under Model No, LX-130T (transmitter) and Model LX-132R (receiver). The laser sending and receiving units 80, 82 periodically sample the width of the tow 19 with respect to time as the tow 19 continuously moves therebetween and these sample measurements are processed by software within an optional PC data acquisition unit such as, for example, an IBM personal computer 63, depicted in FIG. 1. These sample measurements can be recorded in bar graph form to provide a running indication of the variation of the width of the incoming tow 19 prior to the sizing operation performed in the manner described below. This information may be very useful in certain applications, such as the certification processes required for aircraft parts.

In the presently preferred embodiment, structure is provided to maintain the lenses associated with each of the laser sending and receiving units 80, 82 substantially free of debris, i.e., particulate matter which may become separated from the tow 19 as it passes through the gauging assembly 68. This structure comprises the U-shaped bracket 69, having righthand and lefthand shroud portions 84, 85 adjacent to the laser sending and receiving units 80, 82, respectively, which, in turn, are connected by air lines 86° to a source of pressurized air (not shown). At least periodically, but preferably continuously, jets of air are directed through lines 86 into each of the shroud portions 84, 85 to dislodge any debris which might collect on the lenses of the laser sending or receiving units 80, 82 so that there are no inaccuracies in the width measurements of the tow 19.

Figure 4A:
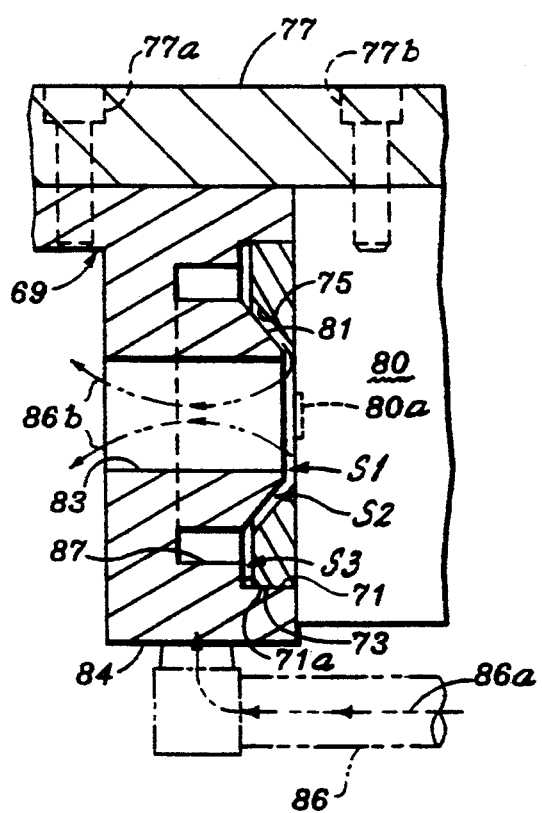
FIG. 4A is an enlarged plan section through the righthand shroud portion and adjacent laser sending unit, taken along the line 4A—4A of FIG. 4.

FIG. 4A is an enlarged plan section through the righthand shroud portion 84 of the U-shaped bracket 69, which shows the bracket 69 and adjacent laser sending unit 80 held to the support plate 77 by screws 77a, 77b. The shroud portion 84 is generally rectangular and has an entrance counterbore 71 in line with the lens 80a of the sending unit 80. A ring 73 is cemented into the counterbore 71 and sized so that a thin annular space S1 is created between the ring 73 and the inner end 71a of the counterbore 71. The ring 73 has a central conical bore 75 oriented with its apex end towards the sending unit 80. The shroud portion 84 includes a conical boss 81 within the counterbore 71, disposed within (but not touching) the conical ring bore 75, and results in a thin conical space S2 between the boss 81 and ring 73. The boss 81 is shorter than the counterbore depth, and thereby creates a thin circular space S3 between the boss 81 and the sending unit 80. It should be noted that the thin spaces S1, S2, S3 are shown greatly exaggerated for illustration purposes. A slot 83 is machined through the boss 81 so the sending unit 80 can direct its laser beam to the tow 19 and laser receiving unit 82; the slot 83 is oriented with its length running across the gauged width of the tow 19.

Figure 4B:
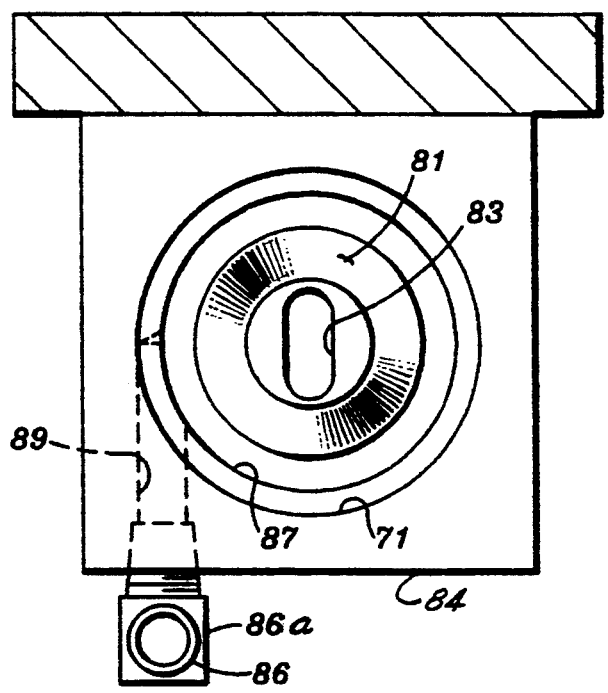
FIG. 4B is an enlarged elevational section, taken along the line 4B—4B of FIG. 3.

With reference also to FIG. 4B (depicted with the ring 73 removed for clarity of illustration), an annular groove 87 is machined into the inner end 71a of the counterbore 71 around the base diameter of the boss 81, and a pipe-tapped hole 89 is drilled from the exterior of the shroud portion 84 to intersect with the annular groove 87. The air line 86 is connected to the pipe-tapped hole 89 by a suitable fitting 86a. In operation, therefore, the air line 86 ports a stream of air 86b into the groove 87 which evenly distributes the air 86b to the annular space S1; the air 86b next flows in convergence through the conical space S2, thence radially-inward through the circular space S3, and out through the slot 83. The construction details of the two shroud portions 82, 84 are identical.

An outgoing tow gauging assembly 88 is located adjacent the side panel 50 of cabinet 44 which senses the width of the sized tow 19 before it is directed to the drive unit 16 and take-up winder 18. The structure and operation of the outgoing tow gauging assembly 88 is identical to incoming gauging assembly 68 and the same reference numbers are used to depict the same structure of each. The purpose of the outgoing tow gauging assembly 88 is to provide an essentially continuous sampling of the width measurement of the sized tow 19 to ensure that the sizing operation described below has been completed effectively, and that the tow 19 is within predetermined tolerances.

TOW HEATING

Referring now to FIGS. 2 and 5–7, structure is illustrated for heating the tow 19 prior to the sizing operation. While this heating step is not considered essential for all types of composite materials, it is contemplated that many composite tows will be more readily sized after heating to at least some elevated temperature above ambient immediately prior to sizing.

As depicted in the FIGS., the tow 19 leaves the incoming tow gauging assembly 68 and is trained in a counterclockwise direction over a second idler roller 90 mounted to a stand-off 91 carried by the mounting plate 56. The tow 19 travels substantially horizontally from roller 90 to a heating nozzle 92 connected to a fluid heating torch unit 94 commercially available from The Sylvania Company. The torch unit 94 is carried by a bracket 95 connected to mounting plate 56 and is supplied with gas, for example air, via a line 97. The air is then heated by electric heating elements (not shown) within the torch unit 94.

As best shown in FIGS. 2 and 5–7, the nozzle 92 comprises a generally rectangular, horizontal nozzle body 96 formed with a vertical supply passage 98 having an inlet 100 connected by fitting 101 to the outlet 104 of the torch unit 94 to receive heated air therefrom, and a plate 105 mounts the nozzle body 96 to the torch unit 94. The upper portion of supply passage 98 in nozzle body 96 interconnects with a transverse upper bore 110 which extends substantially along the length of the nozzle body 96. This upper bore 110 is connected by a number of axially spaced connector bores 112 to a distribution channel 114 formed at the outer or lefthand face of the nozzle body 96 as viewed in FIG. 7. This distribution channel 114 is closed by a cover plate 116 connected by screws 118 to the nozzle body 96. The cover plate 116 is formed with a notch 120 at its lower end, at the base of distribution channel 114, directly opposite a seat 122 formed in the nozzle body 96. The notch 120 and seat 122 support an upper nozzle plate 124 in a horizontal position at the base of distribution channel 114. This upper nozzle plate 124 is formed with a plurality of longitudinally spaced discharge bores 126 located directly above an elongated, longitudinally extending tow slot 128 formed in the nozzle body 96 which receives the tow 19. A flow path for the heated air from the torch unit 94 is therefore provided from the supply passage 98 into the upper bore 110, through connector bores 112 and into the distribution channel 114 where the heated air is directed downwardly through the discharge bores 126 in upper nozzle plate 124 onto the top side of the tow 19 passing through the tow slot 128.

The identical structure described above is provided at the bottom portion of nozzle body 96 so that a flow path is formed to direct heated air onto the opposite or bottom side of the tow 19 as it moves through the tow slot 128. The lower portion of the supply passage 98 interconnects with a transverse lower bore 130 running beneath the upper bore 110 and parallel thereto, and this lower bore 130 communicates via connector bores 132 with a lower distribution channel 134 formed in the nozzle body 96. The lower distribution channel 134 is closed by a cover plate 136 connected by screws 118 to the nozzle body 96. The cover plate 136 is formed with a notch 138 located opposite a seat 140 formed in the nozzle body 96. The notch 38 and seat 140 mount a lower nozzle plate 142 in a horizontal position below the upper nozzle plate 124. The lower nozzle plate 142 is formed with discharge bores 144 which are oriented toward the bottom surface of the tow 19 as depicted in FIG. 7. A flow path for the heated air from torch unit 94 is therefore created from supply passage 98 through the lower bore 130 and connector bores 132 into the lower distribution channel 134 from which the heated air is transmitted through the discharge bores 144 in lower nozzle plate 142 onto the bottom surface of the tow 19, passing through the tow slot 128. A threaded hole 102 extends from the inner or righthand face of the nozzle body 96 as viewed in FIG. 7. This threaded hole 102 intersects the lower bore 130 and the lower portion of the supply passage 98, and forms a well for receiving a thermocouple 103. The thermocouple tip 130a extends into the airstream for the purpose of monitoring and automatically adjusting the air temperature through electric controls (not shown) in a manner well known in the art.

As seen in FIGS. 5 and 6, the upper and lower bores 110, 130 each have an end closed with a pipe plug 106. In certain instances it may be desirable or preferable to incorporate an optional means for rapidly ridding the nozzle 92 of unwanted heat; for example, in a case where tow movement through the nozzle 92 is slowed or stopped and the steady-state level of tow heating employed is such that merely turning off the torch unit 94 will not result in sufficient heat dissipation from the nozzle 92 before the tow 19 is damaged. Such an optional means may be achieved by removing the pipe plugs 106 and connecting the upper and lower bores 110, 130 to the inlet port 107 of an air dump valve 108. The valve 108 is shown symbolically shown in FIG. 6 as a solenoid-operated, spring-return two-way fluid porting valve. The bore connection port 107 is normally-blocked to exhaust; upon actuation, the port 107 exhausts through the valve 108 to atmosphere.

FLATTENING/GUIDE ROLLERS

Figure 8:
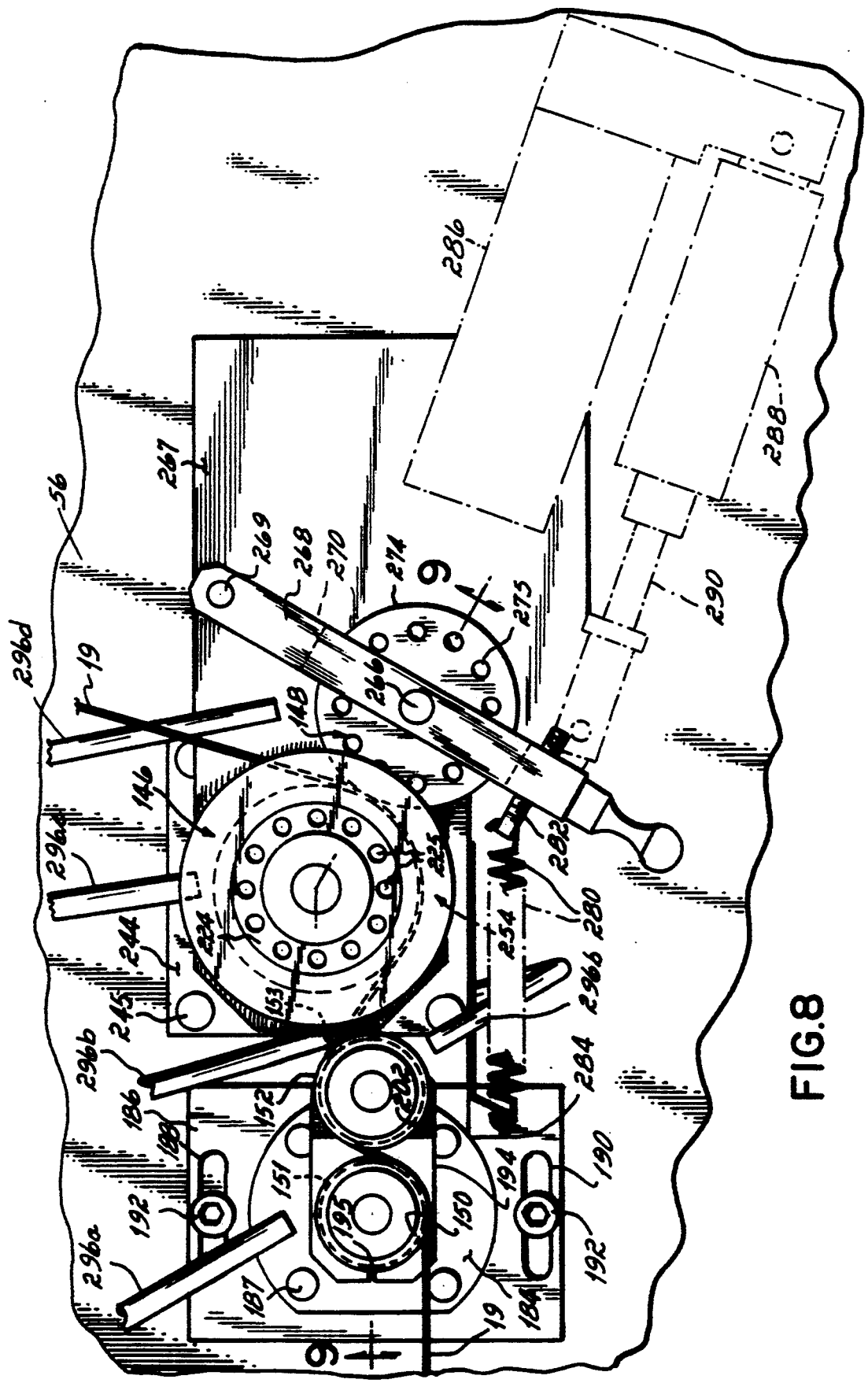
FIG. 8 is an enlarged front view of the sizing wheel of the tow sizing unit shown in FIG. 2.
Figure 9A:
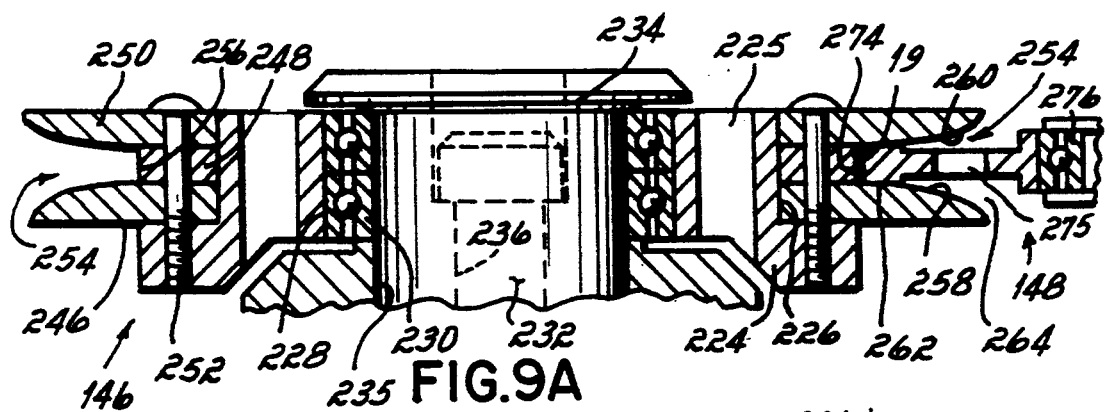
FIG. 9A is an enlarged view of the sizing wheel shown in FIG. 9.

Referring now to FIGS. 8–9, different embodiments of roller arrangements are illustrated which are located, immediately upstream from a sizing wheel 146 and a presser roller 148 which perform the tow sizing operation discussed below. These various roller arrangements function to guide the tow 19 to the sizing wheel 146, and also flatten or widen the tow 19, when required, so that it has at least a predetermined minimum width prior to introduction to the sizing wheel 146.

In one presently preferred embodiment shown in FIGS. 8 and 9, two widening or flattening rollers 150 and 152 are mounted side-by-side immediately upstream from the sizing wheel 146. The roller 150 is formed with a circumferential groove 151 of concave, arcuate cross section and the roller 152 has a groove 153 formed with opposed, tapered sidewalls 155a, b and a bottom wall 157 therebetween formed with a convex crown. The tow 19 is fed in a counterclockwise direction around the groove 151 in roller 150 and then in a clockwise direction between the tapered sidewalls 155a, b of roller 152. Sufficient tension is applied to the tow 19 so that it becomes at least partially flattened or spread against the bottom wall 157 of roller 152 prior to introduction to the sizing wheel 146.

Figure 8A:
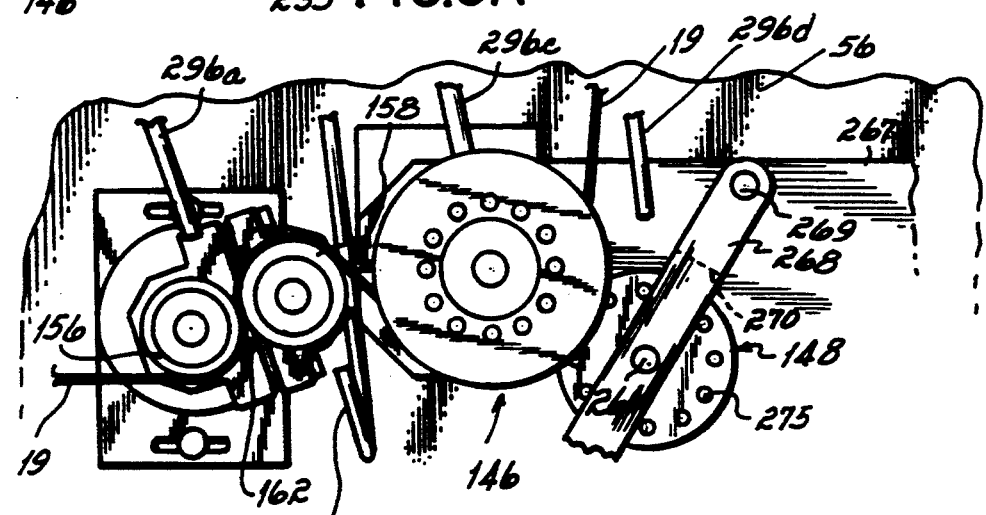
FIG. 8A is a view similar to FIG. 8 showing an alternative construction of the guide or flattening rollers upstream from the sizing wheel.

In an alternative embodiment shown in FIG. 8A, two pinch rollers 156 and 158 each having a substantially smooth cylindrical outer surface are mounted side-by-side forming a nip 162 therebetween of predetermined thickness. In this embodiment, the tow 19 is passed into the nip 162 between the rollers 156, 158 which positively engage and flatten the tow 19 therebetween before introduction into the sizing wheel 146.

Figure 8B:
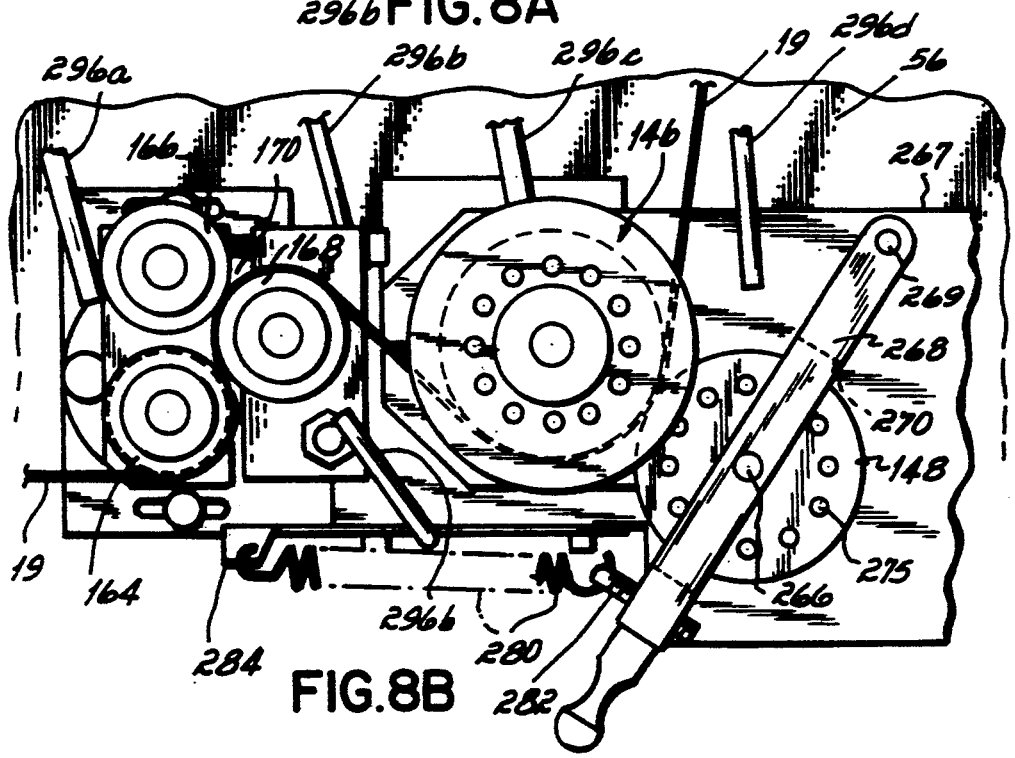
FIG. 8B is a still further embodiment of the guide or flattening rollers herein.

A still further embodiment of a roller arrangement is illustrated in FIG. 8B wherein three rollers 164, 166 and 168 are mounted upstream from the sizing wheel 146. In this embodiment, the tow 19 is trained in a counterclockwise direction over the first roller 164 and is then directed into the nip 170 formed between the two pinch rollers 166 and 168 so that the tow 19 is both flattened under tension as it passes along roller 164 and then squeezed or flattened between pinch rollers 166 and 168 prior to introduction into the sizing wheel 146. In each of the embodiments of FIGS. 8, 8A and 8B, the roller arrangement thereof functions to both guide and at least partially flatten the heated tow 19 so that the tow 19 has at least a predetermined minimum width and is smoothly fed to the sizing wheel 146 for sizing.

A roller mounting arrangement is depicted in FIGS. 8 and 9 for flattening rollers 150 and 152 to position such rollers in alignment with the sizing wheel 146. A similar mounting arrangement can be employed for rollers 156, 158 of FIG. 8A and for rollers 164, 166 and 168 of FIG. 8B, the details of which are not separately illustrated herein.

As shown in FIGS. 8 and 9, the roller 150 is carried by a bearing 172 mounted by a cap 174 and screw 176 to a stepped mounting shaft 178. This mounting shaft 178 is received within the hollow core 180 of a stand-off 182 having a flange 184 connected to an adjustment plate 186 by screws 187. Means are provided to retain the shaft 178 in a fixed position within the stand-off 182 such as a set screw 183 extending through the wall of the stand-off 182 into engagement with the shaft 178. The adjustment plate 186 is formed with a pair of elongated slots 188 and 190, each of which receive a mounting screw 192 which extends through the adjustment plate 186 and into the rear mounting plate 56 of the cabinet 44. See FIG. 8. These slots 188, 190 permit side-to-side or horizontal adjustment of the position of stand-off 182, and, in turn, rollers 150 and 152, with respect to the sizing wheel 146.

The outer end of stand-off 182 mounts a bracket 194 formed with a radial saw slot 195 that intersects a bore 196 which is received on a portion of the stepped mounting shaft 178. The term "outer" as used herein is meant to refer to a direction away from the rear mounting plate 56 of cabinet 44. The bracket 194 is formed with a slot 198, on the side opposite slot 195, which mounts an extension 200 of a roller support 202 for the second flattening roller 152. A cone-point set screw 204 and a detent 204a cooperate to hold the extension 200 in place within the slot 198 of bracket 194. The bracket 194 is tightly secured on shaft 178 by clamping screws 195a while the set screw 204 and detent 204a permit at least some pivotal movement of the extension 200, and, in turn, roller 152, as the tension on tow 19 is varied. As viewed in FIG. 9, the roller support 202 includes a body 206 formed with a bore 208 which receives a slidable mounting plug 210. A bearing 212 which mounts the roller 152 is connected to the plug 210 by a cap 214 and mounting screw 216. The opposite end of the plug 210 is mounted within the body 206 by a lag screw 218 passing through the inner end of the body 206 and into the plug 210 through a seat 220 formed therein. This seat 220 carries a spring 222 which extends to the end of the bore 208. This mounting structure for roller 152 allows for axial adjustment of roller 152 with respect to the rear mounting plate 56 so that rollers 150, 152 are aligned with one another and with the sizing wheel 146.

TOW SIZING WHEEL AND PRESSER ROLLER

Referring to FIGS. 8–10, the sizing wheel 146 and presser roller 148 are illustrated in more detail. In one presently preferred embodiment, the sizing wheel 146 comprises a flanged circular disc 224 formed with a cylindrical hub 226 and a central bore 228 which receives a bearing 230. The circular disc 224 is formed with a plurality of circumferentially spaced bores 225 which aid in dissipating heat and reduce the weight of disc 224. The bearing 230 is mounted on a post 232 against a flange 234. The post 232 is carried within a bore 235 formed in the outer end of a stand-off 242, whose inner end includes a flange 244 mounted by screws 245 to the rear mounting plate 56 of cabinet 44. In order to secure the post 232, bearing 230 and sizing wheel 146 to the stand-off 242, a mounting screw 236 passes through the post 232 and into a threaded portion 238 of a stepped cavity 240 formed in a stand-off 242.

With reference to FIG. 9, the hub 226 within the circular disc 224 of sizing wheel 146 mounts an inner flange 246, a circular ring 248 and an outer flange 250 which are stacked atop the other and secured to the disc 224 by a number of circumferentially spaced screws 252. The circular ring 248 is sandwiched between the inner and outer flanges 246, 250 which collectively define a circumferential sizing groove 254. The sizing groove 254 has a cylindrical-shaped bottom surface 256 defined by the outer surface of circular ring 248, an inner side surface 258 formed by the inner flange 246, and an outer side surface 260 formed by the outer flange 250. In the presently preferred embodiment, each of the inner and outer side surfaces 258 and 260 extend radially outwardly from the axis of rotation of the circular disc 224 and from the bottom surface 256 formed by the circular ring 248. The inner side surface 258 of inner flange 246 and the outer side surface 260 of outer flange 250 are each generally curvilinear in shape. Preferably, such surfaces 258, 260 form a lower groove portion 262 in which the side surfaces 258, 260 are essentially parallel to one another at least adjacent the bottom surface 256 of groove 254, and are axially spaced thereat a distance equal to the desired finished thickness of the tow 19. From this lower groove portion 262, the inner and outer side surfaces 258, 260 taper outwardly from one another so that the transverse dimension of the sizing groove 254 progressively increases to a relatively wide throat or inlet portion 264 at the ends of the inner and outer flanges 246, 250.

The configuration of the sizing groove 254 is intended to permit the smooth transfer of the tow 19 from the flattening rollers 150, 152 toward the bottom surface 256 of sizing groove 254. The relatively wide inlet portion 264 of the sizing groove 254 allows for some misalignment of the tow 19 between the rollers 150, 152 and sizing wheel 146. Additionally, the tapered, curvilinear inner and outer side surfaces 258, 260 formed by the inner and outer flanges 246, 250, respectively, help to smoothly transfer the tow 19 to the bottom surface 256 of sizing groove 254.

In an alternative embodiment depicted in FIG. 10, an adjustable width sizing wheel 320 is provided as a replacement for the fixed width sizing wheel 146 of FIG. 9. Sizing wheel 320 includes an inner flange 322 forming an inner side surface 324, and an outer flange 326 forming an outer side surface 328, which together define a sizing groove 329. The inner flange 322 is mounted in a fixed position on a stepped shaft 330, and the outer flange 326 has internal threads which mate with an externally threaded portion 332 of shaft 330. The outer flange 326 is thus axially movable along shaft 330, toward and away from the inner flange 322, defining a bottom surface 334 of sizing groove 329 at the outer surface of shaft 330 whose width dimension can be varied as desired depending on the spacing between flanges 322, 326. The outer flange 326 is held fixed in the desired position along shaft 330 by a set screw 336. The stepped shaft 330 is carried by a bearing 338 mounted to a stand-off 340 of the same type as standoff 242.

As depicted in FIG. 10, the sizing groove 329 of this embodiment is similar to the sizing groove 254 of FIG. 9. The inner and outer side surfaces 324, 328 are both generally curvilinear in shape forming a lower groove portion 342 adjacent the bottom surface 334 wherein side surfaces 324, 328 are substantially parallel to one another. The side surfaces 324, 328 taper outwardly away from one another from the lower groove portion 342 to a relatively wide throat or inlet portion 344 at their outer ends.

In either of the above-described embodiments, the tow sizing operation is performed by contacting the tow 19 with presser roller 148 and forcing it between the inner and outer side surfaces 258, 260 of the sizing groove 254 to the lower groove portion 262 therebetween and against the bottom surface 256 of groove 254, (FIG. 9), or, alternatively, between the inner and outer side surfaces 324, 328 of sizing groove 329 to the lower groove portion 342 and against the bottom surface 334 thereof (FIG. 10). In this position in either embodiment, the top surface, bottom surface and side edges of tow 19 are all confined between the bottom surface 256 or 334 and side surfaces 258, 260, or 324, 328 of sizing grooves 254, 329, respectively, and the presser roller 148. This effectively forms the tow 19 with a substantially uniform width equal to the spacing between the inner and outer side surfaces 258, 260 or 324, 328 at the lower groove portion 262.

With reference to FIGS. 8–9, the presser roller 148 is freely rotatable on a shaft 266 straddle-mounted within a bifurcated portion 270 of a biasing arm 268. The biasing arm 268, in turn, is pivotally mounted by a pin 269 to a bracket 267 which is pivotally adjustable and affixed to the stand-off 242 associated with sizing wheel 146. Preferably, the presser roller 148 includes an outer ring 272 having an outer edge 274 insertable within the sizing groove 254 of the sizing wheel 146. The outer ring 272 is mounted by a bearing 276 to an inner disc 278 fixedly mounted to the shaft 266. A pair of these spacers 266a center the presser roller 148 within the bifurcated portion 270, and shield the bearing 276. The outer ring 272 is therefore freely rotatable on bearing 276 relative to the disc 278 and shaft 266 as the tow 19 moves through the sizing wheel 146.

In the embodiment depicted in FIG. 8, the outer edge 274 of outer ring 272 is biased toward the bottom surface 256 of sizing groove 254 by a spring 280. The spring 280 is connected at one end to a threaded pin 282 adjustably mounted to the biasing arms 268, 270, and the opposite end of spring 280 is held by a flange 284 which is connected to the bracket 267. The axial position of the threaded pin 282 carried by the biasing arm 268 is adjustable to vary the tension exerted by spring 280 urging the biasing arm 268, and, in turn, the presser roller 148 toward the sizing wheel 146. As a result, the force with which the tow 19 is pressed between the sizing wheel 146 and presser roller 148 is adjustable to account for different types of materials and other variables.

In an alternative embodiment illustrated in phantom lines in FIG. 8, the spring 280 is eliminated and replaced with a cylinder arrangement. An L-shaped bracket 286 is connected at one end to the bracket 267 and mounts at its opposite end a fluid cylinder 288. The piston rod 290 of cylinder 288 is connected to the biasing arms 268, 270 in position to move the biasing arm 268, and the presser roller 148, toward and away from the sizing wheel 146. Operation of the fluid cylinder 288 can be closely controlled to accurately vary the pressure with which the piston rod 290 urges the biasing arm 268, and presser roller 148 against the sizing wheel 146 to ensure that the width of tow 19 is accurately sized within the sizing wheel 146.

COOLING DEVICES

As mentioned above, it is preferable for many types of composite materials to heat the tow 19 using heating nozzle 92 before the tow 19 is introduced between the sizing wheel 146 and presser roller 148. Additionally, it is preferable to direct the tow 19 between flattening rollers 150, 152 upstream from sizing wheel 146 to ensure that the tow 19 has at least a predetermined minimum width. It is also desirable to avoid elevating the temperature of the tow 19 to such an extent that it may be difficult to handle downstream from the sizing wheel 146 and/or to wind on a reel 31 at the take-up winder 18. It is therefore important that the rollers, wheels and other structure which comes into contact with the tow 19 do not experience temperature growth from heat given off by the tow 19 during steady state operation.

Figure 2B:
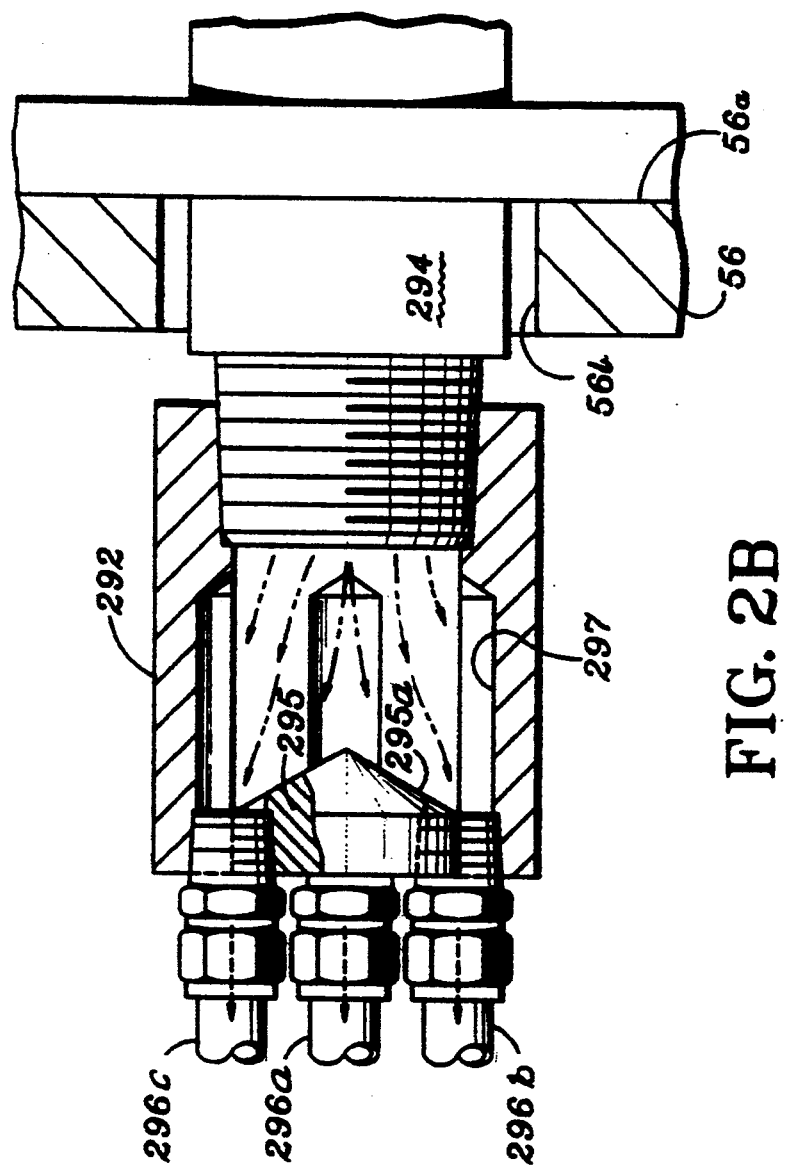
FIG. 2B is an elevational section through the manifold cooling block, taken along the line 2B—2B of FIG. 2A.
Figure 2A:
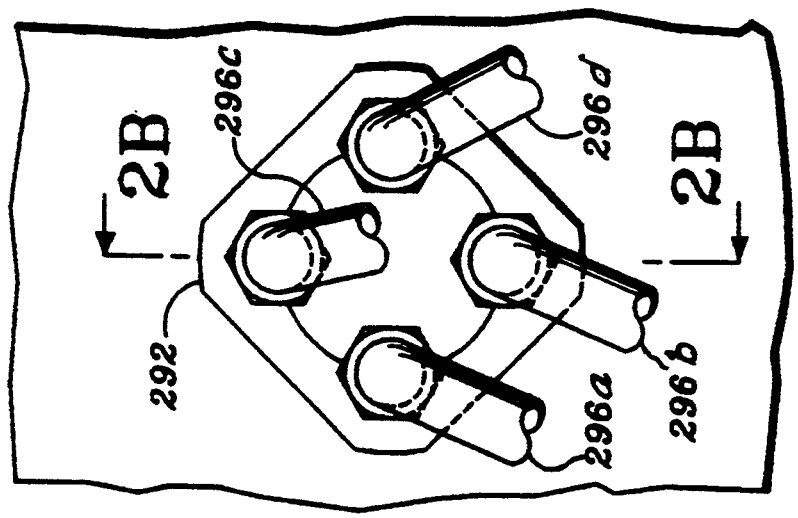
FIG. 2A is an enlarged view of the manifold cooling block of FIG. 2.

With reference to FIGS. 2, 2A, 2B, and 8, cooling structure is provided to cool the tow 19 and to cool the elements which contact the tow 19 in performing the flattening and sizing operation. In the presently preferred embodiment, a manifold cooling block 292 is carried on the front of a Vortec tube 294 commercially available from The Vortec Company of Cincinnati, Ohio. Copper tubes 296a–d are connected to the manifold cooling block 292 and extend downwardly to the flattening and sizing elements. As seen in FIG. 2B, the Vortec tube 294 is mounted to the rear face 56a of the mounting plate 56 and extends through a clearance hole 56b in the plate 56. The manifold cooling block 292 has a central bore 293 provided with threads at one end for receiving the Vortec tube 294. The other end of the bore 293 is fitted with a plug 295. Four equally-spaced pipe-tapped distributor holes 297 are drilled through the plug around its periphery, to mount the copper tubes 296a–d in fluid communication with the bore 293. The plug 295 has a conical end 295a, of 120-degree included angle, oriented with its apex facing the Vortec tube 294, to smoothly divert air flow to the tubes 296a–d. Tube 296a extends to the flattening roller 150, tube 296b extends beneath the second flattening roller 152, tube 296c extends above the sizing wheel 146, and tube 296d terminates above the presser roller 148. Preferably, the presser roller 148 is formed with a plurality of circumferentially spaced bores 275 which aid in dissipating heat therefrom and reduce its weight. A chilled stream of air is emitted from Vortec tube 294 into the manifold block 292 and then through each of the tubes 296a–d to cool the above-mentioned elements as the tow 19 passes therethrough.

After leaving the sizing wheel 146, the tow 19 moves upwardly into a cooling nozzle 298 which is carried by a copper tube 299 secured to the mounting plate 56 of cabinet 44 by a bracket 300. The construction of cooling nozzle 298 is identical to that of heating nozzle 92, and a description of the structural details of same is not repeated herein. A second Vortec tube 302 mounted to the mounting plate 56 of cabinet 44 and connected to copper tube 299 directs chilled air into the cooling nozzle 298 for cooling of the tow 19 before the tow 19 is directed out of the cabinet 44. However, in the cooling nozzle 298, the thermocouple 103 (see FIG. 7) serves only to monitor the cooling air temperature. Adjustment of the air temperature is performed by manually adjusting a flow control valve (not shown) governing flow through the second Vortec tube 302.

The tow 19 leaves cooling nozzle 298 and passes in a clockwise direction over an idler 304 mounted by a standoff 306 to the mounting plate 56. The tow 19 then passes through the outgoing gauging assembly 88, described in detail above, from which it is discharged to another idler roller 308 mounted by a stand-off 310 to mounting plate 56. The tow 19 proceeds through the opening 54 in the side panel 50 of cabinet 44 to the drive unit 16 take-up winder 18 where it is wound on reel 31.

OPERATION OF SIZING APPARATUS

The operation of the sizing apparatus 10 proceeds as follows. A tow 19 of non-uniform width is pulled by the drive unit 16 from the tensioner unit 12 where it is carried on a reel 20. The tow 19 is wrapped around the drive rollers 26, 28 of drive unit 16 to provide for positive movement of the tow 19 through the tow sizing unit 14, and the tensioner unit 12 maintains substantially constant tension on the tow 19. In the presently preferred embodiment, the width of the tow 19 is measured by the incoming gauging assembly 68 of the tow sizing unit 14 which sends signals through the control unit 62 to the data acquisition unit 63 (FIG. 1) which is capable of converting the measurements into bar graph form. This information may be useful to provide an indication of the tolerance variation of the tow width for comparison with the finished width of the tow as measured by the outgoing gauging assembly 88 located downstream from the sizing wheel 46 of tow sizing unit 14. The outgoing gauging assembly 88 is structurally and functionally identical to the incoming gauging assembly 68 and may, therefore, result in the optional production of a graph representing the finished width of the tow 19 after sizing.

It has been found that tows 19 formed of some composite material from some manufacturers have relatively widely varying width tolerances including some instances wherein the width of the tow 19 is less than a predetermined minimum desired width. Accordingly, the tow 19 is fed to flattening rollers 150, 152 which are located upstream from the sizing wheel 146. Alternative embodiments of such tow flattening rollers are illustrated in FIGS. 8A and 8B and are included in tow sizing unit 14 for the same purpose of initially flattening the tow 19. The type of flattening roller arrangement utilized is dependent upon the condition of the tow 19 and the particular composite material from which it is made. As discussed above, the flattening rollers in any of the embodiments of FIGS. 8, 8A and 8B function to widen the tow 19 to at least a predetermined minimum width in preparation for the sizing operation performed by the sizing wheel 146 or 320 and presser roller 148. The flattening rollers also function to help guide the tow 19 to the sizing wheel 146.

In the presently preferred embodiment, the tow 19 is heated by heating nozzle 92 located immediately upstream from the sizing wheel 146 and presser roller 148. It is contemplated that the width sizing operation will be more effective for many types of composite materials if the tow 19 is presented to the sizing wheel 146 at elevated temperature. By raising the temperature of the tow 19, the matrix material which binds the composite fibers of the tow becomes more flexible, if not at least partially molten, to facilitate the sizing operation. The temperature of the heated air supplied to the heating nozzle 92 by torch unit 94 is variable to accommodate tows 19 having different types of composite fibers and/or different types of matrix material.

The heated tow 19 is discharged from the heating nozzle 92 and directed into the sizing groove 254 of sizing wheel 146 or the sizing groove 329 of sizing wheel 320. Considering the sizing wheel 146, for example, the tow 19 first enters into the relatively wide inlet portion 264 of groove 254 and is then slid along one or both of the inner and outer side surfaces 258, 260 to the bottom surface 256 of sizing groove 254. The arcuate or curvilinear shape of the inner and outer side surfaces 258, 260 ensures that the tow 19 is smoothly transferred within the groove 254. In the embodiment of FIGS. 8 and 9, the axial space between the inner and outer side surfaces 258, 260 is a fixed distance thus forming a cylindrical-shaped bottom surface 256 of predetermined width. In the alternative embodiment illustrated in FIG. 10, the outer flange 326 is axially movable with respect to the inner flange 322 so as to vary the axial spacing therebetween to accommodate tows 19 of varying width. In either embodiment, the presser roller 148 is biased into the sizing groove 254 (or 329) toward its bottom surface 256 (or 334) so that the outer edge 274 of the outer ring 272 of presser roller 148 fits closely between the inner and outer side surfaces 258, 260 (or 324, 328) at the lower groove portion 262 (or 342) and into engagement with one side of the tow 19. In this position, the tow 19 is confined on all four sides, i.e., one side of tow 19 rests against the bottom surface 256 (or 334), the opposite side engages the outer edge 274 of presser roller 148 and its side edges engage the inner and outer side surfaces 258, 260 (or 324, 328) of groove 254 (or 329). As a result, the tow 19 is formed with an accurately controlled width dimension equal to the width of the bottom surface 256 (or 334) of groove 254 (or 329) between its inner and outer side surfaces 258, 260 (or 324, 328).

The accurately sized tow 19 is then discharged from between the sizing wheel 146 and presser roller 148 and directed to the cooling nozzle 298 where the heated tow 19 is returned to a temperature where it can be readily handled. Additionally, as discussed below, the flattening rollers 150, 152, sizing wheel 146 and presser roller 148 are also cooled to prevent heat buildup which would increase the temperature of the tow 19. From the cooling nozzle 298, the tow 19 is directed through the outgoing gauging assembly 88 as discussed above and then out of the cabinet 44 to the drive unit 16 and take-up winder 18 for placement on the take-up reel 31.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof.

For example, it is contemplated that for some types of composite materials and/or matrix materials, the heating and cooling elements of the tow sizing unit 14 could be eliminated or simply not operated while nevertheless obtaining acceptable width sizing by the sizing wheel 146 and pressure roller 148. Additionally, the incoming and outgoing gauging assemblies 68 and 88 could be eliminated or not operated if no record of the width measurement of the tow 19 is needed or desired. It is also contemplated that in some instances the presser wheel 148 may be eliminated where the tension on the tow 19 is sufficient to drive or force the tow 19 to and against the bottom of groove 254.

It should also be understood that while a single tow sizing apparatus 10 is illustrated in the FIGS., a number of such devices arranged side-by-side could be utilized to produce a number of individual tows 19 depending on the requirements of a particular application.

Therefore, it is intended that the invention not be limited to the particular embodiment disclosed as the best mode contemplated for carrying out this invention, but that the invention will include all embodiments falling within the scope of the appended claims.

I claim:

1. A method of sizing a composite tow, comprising:
    directing a composite tow from a tow source into at least one widening member to form the tow with at least a predetermined minimum width;
    directing said composite tow into a groove of a tow sizing member, the groove forming a bottom surface, opposed side surfaces, an inwardly tapering inlet portion, and a lower groove portion in which the side surfaces adjacent the bottom surface are essentially parallel to each other; and
    moving the composite tow into the groove through the inlet portion and between the opposed side surfaces of the groove and against the bottom surface thereof so that the composite tow emerges from the lower groove portion of the tow sizing member having a substantially uniform width.

2. The method of claim 1 in which said step of directing a composite tow includes measuring the width of the composite tow upstream from the tow sizing member.

3. The method of claim 2 in which said step of measuring the width of the composite tow comprises directing the composite tow between the sending and receiving units of a laser gauging device, and at least periodically directing jets of air onto the receiving and sending units to substantially remove debris therefrom.

4. The method of claim 1 in which said step of directing a composite tow includes training the composite tow over at least one roller upstream from the tow sizing member to at least partially increase the width dimension of the composite tow prior to introduction into the groove of the tow sizing member.

5. The method of claim 4 in which said step of training the composite tow includes passing the same face of the composite tow over at least two rollers.

6. The method of claim 4 in which said step of training the composite tow includes passing one face of the composite tow over at least one roller and passing the opposite face of the composite tow over at least one other roller.

7. The method of claim 1 in which said step of moving the composite tow includes pressing an idler roller against one face of the composite tow to force the composite tow between the opposed side surfaces of the groove, and to force the opposite face of the composite tow against the bottom surface of the groove.

8. A method of sizing a composite tow, comprising:
    heating a composite tow supplied from a tow source;
    directing the heated composite tow into a groove in a tow sizing member, the groove having a bottom surface, opposed side surfaces, an inwardly tapering inlet portion, and a lower groove portion in which the side surfaces adjacent the bottom surface are essentially parallel to each other;
    moving the composite tow through the inlet portion and between the opposed side surfaces of the groove and against the bottom surface thereof so that the composite tow emerges from the lower groove portion of the tow sizing member having a substantially uniform width.

9. The method of claim 8 in which said step of heating the composite tow comprises passing the composite tow through a nozzle connected to a source of heated fluid.

10. The method of claim 8 in which said step of moving the composite tow includes pressing an idler roller against one face of the composite tow to force the composite tow between the opposed side surfaces of the groove within the lower groove portion, and to force the opposite face of the composite tow against the bottom surface of the groove.

11. The method of claim 8 further including the step of cooling the composite tow downstream from the tow sizing member.

12. The method of claim 8 further including the step of cooling the tow sizing member.

13. A method of sizing a composite tow, comprising:
    heating a composite tow supplied from a tow source;

directing the heated composite tow into at least one widening member to form the tow with at least a predetermined minimum width;

directing the heated composite tow into a flanged groove formed in a sizing wheel, the flanged groove having opposed side surfaces, a substantially cylindrical bottom surface, an inwardly tapering inlet portion, and a lower groove portion in which the side surfaces adjacent the bottom surface are essentially parallel to each other;

moving an idler roller into the lower groove portion of the flanged groove while rotating the sizing wheel to force the heated composite tow between the opposed side surfaces of the lower groove portion of the flanged groove and against the bottom surface thereof, whereby the composite tow enters the groove through the inlet portion and emerges from the lower groove portion of the sizing wheel with a substantially uniform width.

14. The method of claim 13 in which said step of directing the heated composite tow comprises pulling the composite tow from a tensioning device which carries a first roll of composite tow, through the sizing wheel and to a take-up winder which winds the sized composite tow onto a second roll.

15. The method of claim 13 in which said step of moving the idler roller comprises biasing the idler roller in a direction toward the bottom surface of the flanged groove by operation of a spring connected to the idler roller.

16. The method of claim 13 in which said step of moving the idler roller comprises biasing the idler roller in a direction toward the bottom surface of the flanged groove by operation of a fluid cylinder connected to the idler roller.

17. The method of claim 13 in which said step of directing the heated composite tow comprises pulling the composite tow from a tensioning device through the sizing wheel and to a take-up winder which winds the sized composite tow onto a second roll.

18. The method of claim 13 in which said step of moving the idler roller comprises moving the idler roller in a direction toward the bottom surface of the flanged groove.

19. A method of sizing a composite tow, comprising:
heating a composite tow supplied from a tow source, the composite tow having a width dimension, opposed side edges and opposed faces;

directing the heated composite tow along at least one widening roller to form the tow with at least a predetermined minimum width;

directing the heated composite tow into a flanged groove formed in a sizing wheel, the flanged groove having opposed side surfaces, a substantially cylindrical bottom surface, a lower groove portion in which the side surfaces adjacent the bottom surface are essentially parallel to each other, and an inwardly tapering inlet portion of the groove which narrows in width from the groove inlet down to the groove's lower portion;

moving an idler roller into the lower groove portion of the flanged groove while rotating the sizing wheel to force the heated composite tow between the opposed side surfaces within the lower groove portion of the flanged groove and against the bottom surface thereof, whereby the composite tow enters the groove through the inlet portion and emerges from lower groove portion of the sizing wheel with a substantially uniform width.

20. The method of claim 19 in which said step of directing the heated composite tow along at least one widening roller comprises training the same face of the composite tow over at least two idler rollers.

21. The method of claim 19 in which said step of directing the heated composite tow along at least one widening roller comprises passing one face of the composite tow over at least one roller and passing the opposite face of the composite tow over at least one other roller.

22. A method of sizing a composite tow, comprising:
heating a composite tow supplied from a tow source, the composite tow having a width dimension, opposed side edges and opposed faces;

directing the heated composite tow along at least one widening roller to form the tow with at least a predetermined minimum width;

directing the heated composite tow into a flanged groove formed in a sizing wheel, the flanged groove having opposed side surfaces, a substantially cylindrical bottom surface, a lower groove portion in which the side surfaces adjacent the bottom surface are essentially parallel to each other, and an inwardly tapering inlet portion of the groove which narrows in width from the groove inlet down to the groove's lower portion;

moving an idler roller into the flanged groove while rotating the sizing wheel to force the heated composite tow between the opposed side surfaces of the flanged groove within the lower groove portion and against the bottom surface thereof, whereby the composite tow enters the groove through the inlet portion and emerges from the lower groove portion of the sizing wheel with a substantially uniform width;

cooling the widening roller, sizing wheel and idler roller while the composite tow moves therepast;

cooling the composite tow; and winding the composite tow on a take-up reel.

23. A method of sizing a composite tow, comprising:
heating a composite tow supplied from a tow source, the composite tow having a width dimension, opposed side edges and opposed faces;

directing the heated composite tow along at least one widening roller to form the tow with at least a predetermined minimum width;

directing the heated composite tow into a flanged groove formed in a sizing wheel, the flanged groove having opposed side surfaces, a substantially cylindrical bottom surface, a lower groove portion in which the side surfaces adjacent the bottom surface are essentially parallel to each other, and an inwardly tapering inlet portion of the groove which narrows in width from the groove inlet down to the groove's lower portion and has generally curvilinear shape;

moving an idler roller into the flanged groove while rotating the sizing wheel to force the heated composite tow between the opposed side surfaces of the flanged groove within the lower groove portion and against the bottom surface thereof, whereby the composite tow enters the groove through the inlet portion and emerges from the lower groove portion of the sizing wheel with a substantially uniform width;

cooling the widening roller, sizing wheel and idler roller while the composite tow moves therepast;

cooling the composite tow; and winding the composite tow on a take-up reel.

* * * * *